No. 726,491. PATENTED APR. 28, 1903.
G. T. ALLEN & W. W. MOORE.
MACHINE FOR MIXING AND KNEADING DOUGH.
APPLICATION FILED AUG. 18, 1902.
NO MODEL. 2 SHEETS—SHEET 1.
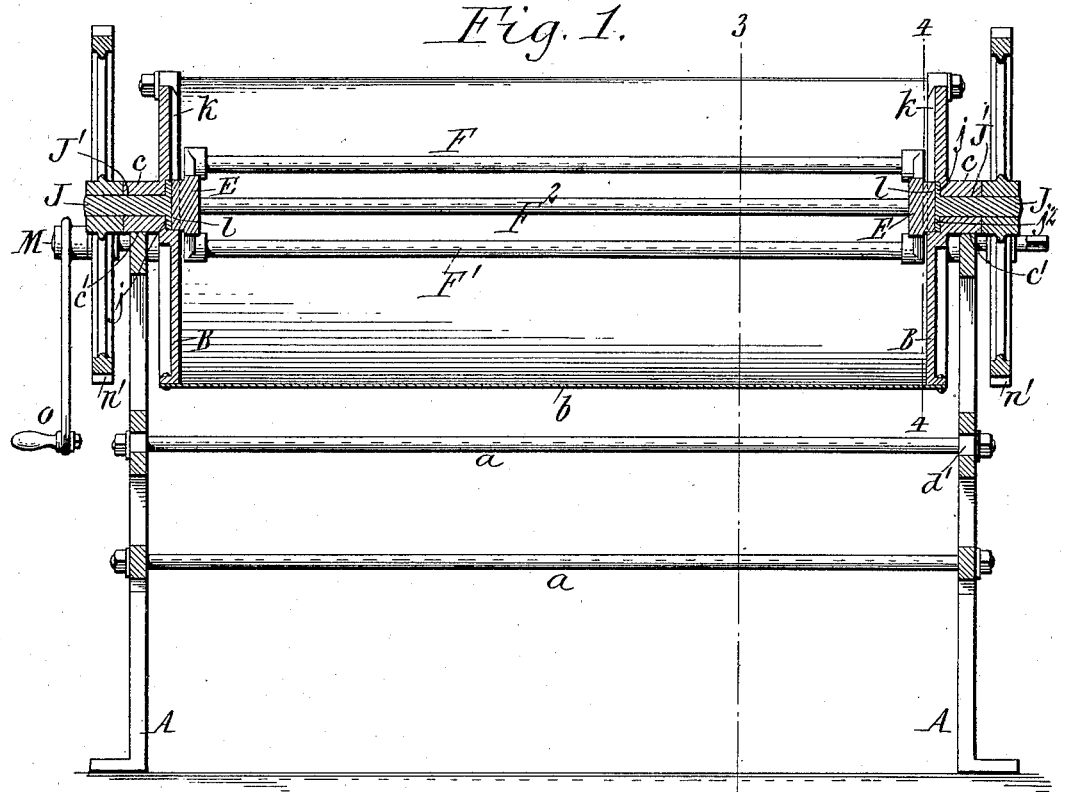
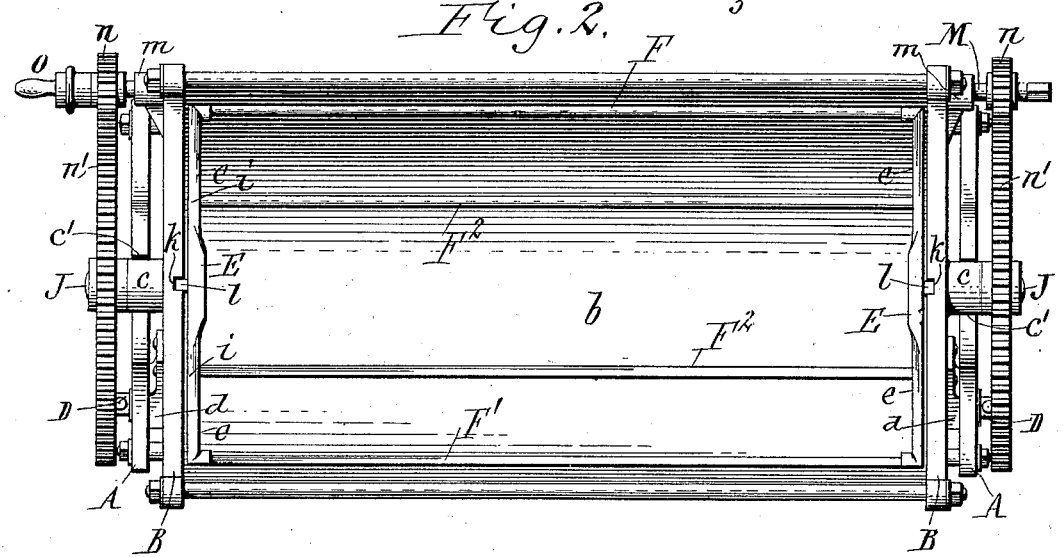
Witnesses:
Frank X. Kibitz
Emma M. Graham
George T. Allen,
Walter W. Moore, Inventors
By Geyer & Popp
Attorneys.

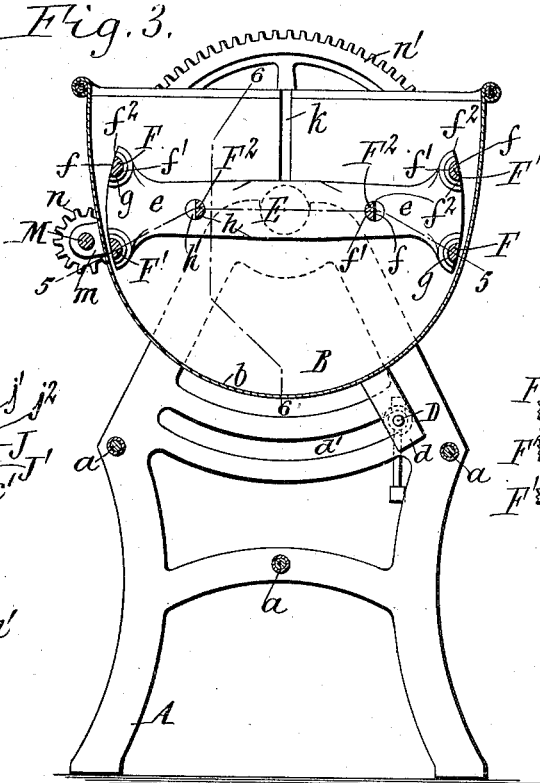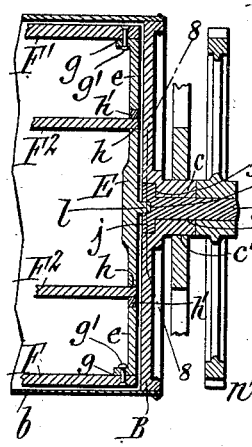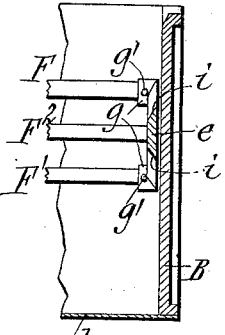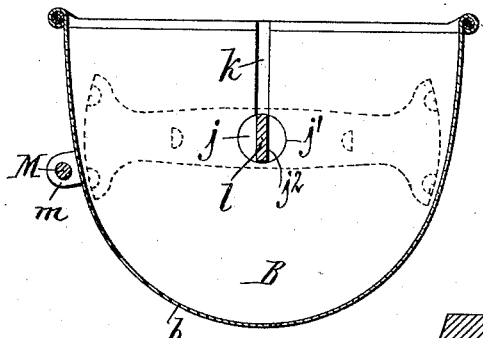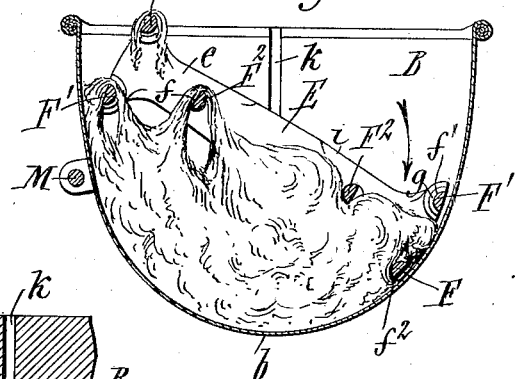

UNITED STATES PATENT OFFICE.

GEORGE T. ALLEN AND WALTER WINFIELD MOORE, OF NEW YORK, N. Y., ASSIGNORS TO EXCELSIOR KNEADING MACHINE COMPANY, OF NEWARK, NEW JERSEY, A CORPORATION OF NEW JERSEY.

MACHINE FOR MIXING AND KNEADING DOUGH.

SPECIFICATION forming part of Letters Patent No. 726,491, dated April 28, 1903.

Application filed August 18, 1902. Serial No. 120,001. (No model.)

*To all whom it may concern:*

Be it known that we, GEORGE T. ALLEN and WALTER WINFIELD MOORE, citizens of the United States, residing at New York, in the county and State of New York, have invented new and useful Improvements in Machines for Mixing and Kneading Dough, of which the following is a specification.

This invention relates to a machine for mixing and kneading dough in the manufacture of bread, &c.

In the manufacture of bread it is of the utmost importance that the ingredients constituting the batter should be thoroughly and intimately mixed and kneaded for the purpose of incorporating the maximum amount of liquid in the batter, so as to obtain the greatest yield of batter and also produce a bread which is very light.

The object of this invention is the production of a machine for this purpose whereby every particle of dough is thoroughly hydrated and aerated in the operation of mixing and kneading the same, resulting in an increased yield of batter or bread dough for a given amount of flour and the production of lighter bread.

In the accompanying drawings, consisting of two sheets, Figure 1 is a vertical longitudinal section of our improved dough mixing and kneading machine. Fig. 2 is a top plan view of the same. Fig. 3 is a vertical cross-section of the same in line 3 3, Fig. 1. Fig. 4 is a cross-section in line 4 4, Fig. 1. Fig. 5 is a fragmentary horizontal section in line 5 5, Fig. 3. Fig. 6 is a fragmentary vertical section in line 6 6, Fig. 3. Fig. 7 is a cross-section similar to Fig. 3, showing the machine in operation. Fig. 8 is a fragmentary cross-section in line 8 8, Fig. 5, showing the position of the parts corresponding to Fig. 7.

Similar letters of reference indicate corresponding parts throughout the several views.

The main frame of the machine consists, essentially, of two transverse standards A A and longitudinal bars $a$, connecting the standards.

The trough or receptacle in which the dough is mixed and kneaded consists of two vertical end walls or heads B and a body $b$ of substantially semicylindrical form connecting the heads. This trough is arranged between the standards and revolubly mounted thereon by means of trunnions $c\ c$, arranged on the outer side of the heads and journaled in bearings $c'$ at the upper ends of the standards. When the machine is in operation, the trough is turned with its open top uppermost, and when it is desired to remove or dump the finished batch of dough the trough is turned with its top to one side for this purpose. The trough is held in the required position by means of clamping-screws D, mounted on arms $d$, depending from the heads of the trough and projecting through segmental slots $d'$ in the standards. Revolubly mounted within the trough is the beater or mixing frame, whereby the batter is mixed and kneaded into dough. This beater consists of two cross bars or heads E, arranged close to the inner side of the trough-heads, and two sets of longitudinal bars F F' $F^2$, connecting the beater-heads. Each of the beater-heads is pivoted at its center, forming two arms $e$, each of which supports the adjacent ends of one set of beater-bars. The beater-bars of each set are so disposed that they will not carry the dough bodily around in the trough and interfere with the mixing and kneading action of the beater on the dough. As shown in Figs. 1, 2, 3, and 7, two outer bars F F' are arranged circumferentially side by side on the outer ends of the corresponding beater-heads and a single inner bar $F^2$ is arranged on said arms at a distance inwardly from the outer bars and opposite the space between the same. By this arrangement of the beater-bars the same enter the dough successively, thereby avoiding the tendency to carry the dough bodily around in the trough, which otherwise would occur if the bars were so arranged that more than one of them entered the dough at the same time. Each of the beater-bars is semicircular, or nearly so, in cross-section and arranged so that its plane or straight side $f$ faces outwardly, while its round or convex side $f'$ faces inwardly, forming slicing or cutting edges $f^2$ at the junction of the plane and convex faces. As the beater rotates the advancing cutting edge $f^2$ of each bar penetrates the dough and divides the same. The peculiar form of this bar causes the dough on the outer or plane side thereof to be separated from the inner part of the dough by the shearing action of the outer side of the bar, whereby the carrying effect of the bar upon the dough is reduced and the latter is permitted to slip from the outer side of the bar and clear the same freely. The inner part of the divided dough clings to the inner side of the bar, owing to the bearing-surface furnished by the convex form of this side of the bar, whereby the dough is carried around to a greater extent and drawn out by frictional contact with the bar. By repeatedly dividing and drawing out the dough on one side of the bar more than that on the other side the dough is thoroughly mixed. In addition to mixing the dough the convex faces of the bars knead the dough and cause the same to be moved from one side of the trough to the other, thereby gradually circulating the same in the trough. The outer beater-bars F F' of each set are arranged to move close to the bottom of the trough, so as to bring all parts of the dough within the influence of the beater and become thoroughly mixed and kneaded. As the beater-bars move through the dough cavities or pockets are formed in the latter in rear of the bars. A partial vacuum exists in the cavities when formed; but when the bars in rising approach the surface of the dough the external air under atmospheric pressure rushes into the cavities with considerable force and effectively aerates all parts of the dough.

By arranging each set of beater-bars in the manner described a plurality of beaters may be employed for increasing the efficiency of the machine without liability of defeating the mixing and kneading effect of the plano-convex bars on the dough. This combined dividing, drawing out, and circulating of the dough in the manner described results in a most perfect and intimate mixing and kneading of the dough, whereby every particle of gluten in the flour and other ingredients is caused to take up or become incorporated with the maximum amount of liquid and air, thereby producing a dough which is thoroughly hydrated and aerated and perfectly uniform throughout in quality and texture.

It has been found by actual test that a batter of flour mixed and kneaded in this machine will commingle with considerable more liquid than in any other machine heretofore known, thereby increasing the volume of dough and yielding more loaves to a given amount of flour. Moreover, the highly-aerated and hydrated condition imparted to the dough when treated in this machine promotes rising of the same by the expansion of gas therein and insures the production of bread which is very light or loose. After the dough has been mixed and kneaded the same may be allowed to rise by confining the same in one end of the trough by a partition after removing the beater; but, if desired, the dough may be allowed to rise in a separate receptacle. The outer end of each beater-arm is widened and provided near opposite edges with concave seats or recesses $g$, which face outwardly and receive the convex inner sides of the beater-bars. The outer bars are secured in the seats of the arms by rivets $g'$, as shown, or in any other suitable manner. The inner or intermediate beater-bars are secured to the narrow inner part of the beater heads or arms by engaging their ends against the inner side of circular openings $h$ in the arms and filling the outer part of said openings by semicylindrical plugs $h'$.

In order to prevent the dough from accumulating in the trough adjacent to its heads, each of the beater-arms is beveled inwardly on its longitudinal edges, as shown at $i$, the beveled edges on the same arm converging inwardly, so that the inner side of the same is substantially convex. The beveled edges of the beater-arms constantly crowd or deflect the dough inwardly or away from the trough-heads, so as to bring the same within the path of the beater-bars and counteract any tendency of the dough to mass next to the trough-heads.

By means of the plano-convex form of the beater bars and arms the effect of these bars and arms on the dough is the same upon turning the beater in either direction, which permits the machine to be readily installed, and when the character of the dough requires it the beater may be turned part of the time in one direction and part of the time in the other direction.

For the purpose of rotating the beater and permitting the same to be easily removed from the trough for emptying or cleaning the same the beater-driving mechanism is constructed as follows: J J represent two horizontal driving-spindles which are arranged axially in alinement and journaled in bearings J' in the trunnions of the trough. Each of these spindles is provided at its inner end with a head or disk $j$, which is seated in a socket $j'$ on the inner side of the respective trough-head flush with the latter. The inner side of the disk $j$ is provided with a coupling-groove $j^2$, which extends diametrically across the same and which is adapted to register with a guide-groove $k$, arranged vertically on the inner side of the trough-head and extending from the upper edge of the same to the upper central part of the socket $j'$.

$l\ l$ represent coupling lugs or keys, whereby the beater is connected with the driving mechanism. These lugs are arranged centrally on the outer side of the beater-heads and fit into the grooves of the spindle-disks, so that the beater is compelled to turn with the spindles. The beater is coupled with the spindles by turning the latter so that their grooves are in alinement with the grooves of the trough-heads and then lowering the beater into the trough and moving its coupling-lugs downwardly through the guide-grooves $k$ into the coupling-grooves $j^2$ of the spindle-disks. The length of each coupling-lug is the same as the diameter of the spindle-disk, which causes the coupling-lug when turning to engage at its edges with the bore of the socket in which the spindle-disk is seated, as shown in Fig. 8, whereby the beater is journaled and held axially in alinement with its driving-spindles. When it is desired to remove the beater, the same is turned, together with the spindles, until the coupling-lugs $l$ and the coupling-grooves $j^2$ are in line with the guide-grooves $k$, when the beater may be lifted out of the trough while moving its coupling-lugs upward through the guide-grooves $k$. The driving-spindles are rotated in unison to avoid wrenching or twisting of the beater by means of a longitudinal driving-shaft M, provided near opposite ends with gear-pinions $n$, which mesh with gear-wheels $n'$, secured to the outer ends of the driving-spindles. The driving-shaft is journaled in bearings $m$ on the trough and may be turned either by power or by means of a hand-crank O, which may be applied to either end of the driving-shaft.

We claim as our invention—

1. In a machine of the class described, the combination with a trough, of a beater revoluble therein and provided with two outer longitudinal bars which are arranged circumferentially side by side and an inner longitudinal bar which is arranged inwardly from the outer bars and opposite the space between the same, substantially as set forth.

2. In a machine of the class described, the combination with a trough, of a beater revoluble therein and comprising heads each having a narrow inner part and a wide outer end, two outer longitudinal bars secured circumferentially side by side to said wide ends, and an inner longitudinal bar arranged inwardly from the outer bars and opposite the space between the same and secured to the narrow part of the heads, substantially as set forth.

3. In a machine of the class described, the combination with a trough, of a beater revoluble therein and comprising two heads each having a circular opening, a plano-convex bar seated at its ends in one side of the openings of the heads, and semicylindrical plugs fitting in the opposite side of said openings for securing said bar in said heads, substantially as set forth.

4. In a machine of the class described, the combination with a trough, of driving-spindles journaled in the ends of said trough and each provided at its inner end with a transverse coupling-groove and a rotary beater arranged in the trough and provided with coupling-lugs engaging with the grooves of said driving-spindles, substantially as set forth.

5. In a machine of the class described, the combination with a trough provided at opposite ends with bearings and a circular socket at the inner end of each bearing, driving-spindles journaled in said bearings, a disk arranged at the inner end of each driving-spindle and turning in the corresponding socket and having a transverse groove at its inner end, and a rotary beater arranged in the trough and provided on its heads with coupling-lugs which engage with the grooves of the disks and bear at their edges against the bore of the sockets, substantially as set forth.

6. In a machine of the class described, the combination with the trough provided in each of its heads with a bearing, a circular socket at the inner end of the bearing, and a vertical guide-groove arranged on the inner side of the head and extending from the upper edge thereof to the central upper part of its socket, a driving-spindle journaled in each bearing, a disk arranged at the inner end of each spindle and turning in the corresponding socket and having a transverse coupling-groove adapted to register with the adjacent guide-groove, and a rotary beater arranged in the trough and having its heads provided with coupling-lugs which fit into the coupling-grooves of said disks, substantially as set forth.

7. In a machine of the class described, the combination with a main frame provided with bearings, a trough provided with trunnions on its heads which are journaled in said bearings, clamping means connecting the trough and frame, driving-spindles journaled in said trunnions and provided at their inner ends with coupling-grooves, a rotary beater arranged in the trough and having its heads provided with coupling-lugs which engage with the coupling-grooves of the spindles, and driving mechanism connected with the outer ends of said spindles, substantially as set forth.

Witness our hands the 14th and 30th days of July, 1902.

GEORGE T. ALLEN.
WALTER WINFIELD MOORE.

Witnesses to the signature of George T. Allen:
FRANCIS E. LINDNER,
JOHN F. ALEXANDER.

Witnesses to the signature of Walter W. Moore:
SHEROD C. BALL,
ERNEST BANKS.